United States Patent [19]

Choi

[11] Patent Number: 5,061,848
[45] Date of Patent: Oct. 29, 1991

[54] NON-CONTACTING ROTARY TYPE MODE SWITCH FOR MAGNETIC TAPE RECORDING DEVICE

[75] Inventor: Jae C. Choi, Seoul, Rep. of Korea

[73] Assignee: Goldstar Co., Ltd., Seoul, Rep. of Korea

[21] Appl. No.: 638,146

[22] Filed: Jan. 9, 1991

Related U.S. Application Data

[63] Continuation of Ser. No. 372,556, Jun. 28, 1989, abandoned.

[30] Foreign Application Priority Data

Jun. 29, 1988 [KR] Rep. of Korea ............... 7918/1988

[51] Int. Cl.$^5$ ............................................. G01D 5/34
[52] U.S. Cl. ............................... 250/229; 250/231.18; 250/237 G
[58] Field of Search ............ 250/231 SE, 237 G, 229, 250/231.18, 231.15, 231.14, 231.16; 341/13

[56] References Cited

U.S. PATENT DOCUMENTS

| | | | |
|---|---|---|---|
| 3,307,041 | 2/1967 | Kling | 250/229 |
| 3,598,933 | 8/1971 | Walser | 250/229 |
| 4,031,386 | 6/1977 | Recker | 250/231.18 |
| 4,053,784 | 10/1977 | Kuze | 250/229 |
| 4,123,653 | 10/1978 | Bovio | 250/231 SE |
| 4,634,861 | 1/1987 | Ching | 250/231 SE |
| 4,788,422 | 11/1988 | Fujiwara | 250/237 G |

*Primary Examiner*—David C. Nelms
*Assistant Examiner*—Que T. Le
*Attorney, Agent, or Firm*—Birch, Stewart, Kolasch & Birch

[57] ABSTRACT

A non-contacting rotary type mode switch for a magnetic tape recording device such as VCR, in which a plurality of reflector pieces are arranged on tracks of a plurality of concentric circles respectively on the rear surface of a mode switch gear, and a plurality of opto-reflection sensor units composed of a light emitter and light receiver for discriminating the presence or absence of the reflector pieces, arranged on the top surface of a switch body, so that the rotational mode of said cam gear, i.e. running state, such as play, review, normal or reverse speed winding, stop and the like can be read out. Since the non-contacting type system utilizing the reflector pieces and opto-reflection sensor units are employed instead of the conventional contacting type, various disadvantages such as mechanical abrasion, deformation, leakage of lubricating oil, and electric discharging are eliminated, and also the system can be miniaturized.

1 Claim, 3 Drawing Sheets

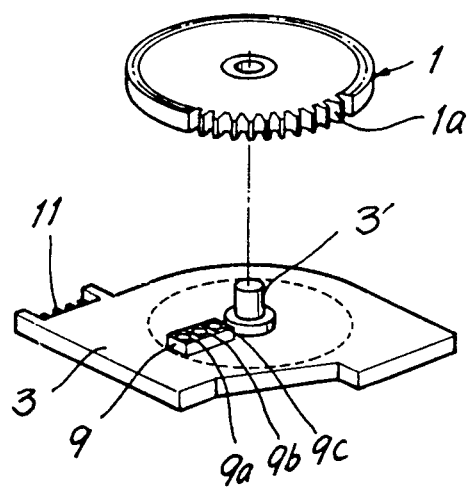
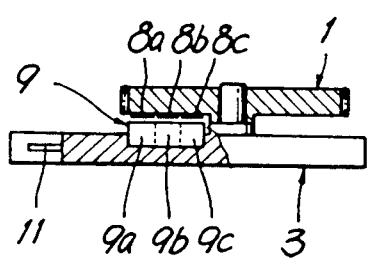
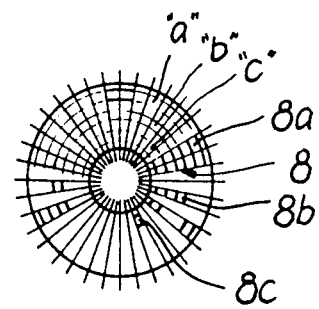
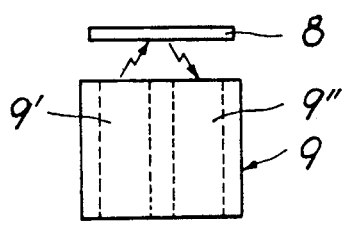
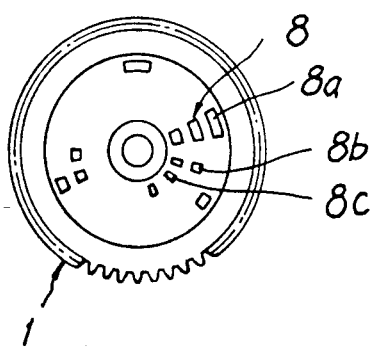

NON-CONTACTING ROTARY TYPE MODE SWITCH FOR MAGNETIC TAPE RECORDING DEVICE

This application is a continuation of application Ser. No. 372,556, filed on June 28, 1989, now abandoned.

BACKGROUND OF THE INVENTION

The present invention relates to a rotary type mode switch system utilized in a magnetic tape recording device such as VCR and the like, and in particular to a non-contacting rotary type mode switch system wherein a plurality of reflector pieces are formed respectively on tracks of a plurality of concentric circles on a rear surface of a mode switch gear, and a plurality of opto-reflection sensors for discriminating the presence or absence of the reflector pieces is provided on a top surface of a switch body, so that the rotating mode of a cam gear can be determined.

In the usual VCR, deck part mechanisms including a tape cassette loading device, tape loading device, tape running device, brake device, driving force cut-off device driven in accordance with various modes, and a mode variation mechanism is carried out by a cam gear having a cam groove formed at least at one surface of an upper and lower surface and gear teeth are formed at a peripheral circumference.

The cam gear is rotated by meshing with a driving gear rotated by a driving force transmitted from a driving source such as a driving motor, and the like, and the cam gear and a sliding type operating plate or operating lever are cooperatively driven so that the running mechanism is formed to operate by each mode, such as play (Play), review (Rev), normal and reverse fast winding (FF) (Rew), and stop (Stop), and the like.

In the driving systematic mechanism, the mode switch device is utilized for detecting the rotational position of the cam gear, and the rotary mode switch employed for a conventional VCR, as shown in FIGS. 1 to 3, is structured such that a brass made contactor 2 is attached on the rear surface of a mode switch gear 1 having external teeth 1a. A similar brass made contactor band 4 is attached at the central portion of a mode switch body 3 made of plastic material, and the mode switch gear 1 is rotatably fixed around an axle pin 3' on the switch body 3 so that the rotational position of mode switch gear 1 is recognized in response to the contacting condition of contactor 2 and contactor band 4. This conventional rotary type mode switch is mounted to a deck part, and electrically connected to a control part, and when cam gear 6 is rotated around axle shaft 6' according to the rotation of driving force transmitting gear 5 by the driving force of the driving motor, a pinion 7 formed integrally thereof is rotated and the mode switch gear 1 coupled therewith is rotated around the axle pin 3', accordingly contactor 2 becomes contacted with contactor band 4. One of the contacting terminals 4a, 4b and 4c of the contactor band 4 is for a common signal line, and a signal of the operating mode becomes possible to be read out according to the contacting position of the mode arrangement of the contactor band 4 and contacting points 2a, 2b and 2c of contactor 2. Reference numeral 11 represents a connector for signal connection in the drawing.

However, since the conventional rotary type mode switch is formed to read out the signal by contacting the contactor band 4 having a plurality of contacting terminals 4a, 4b and 4c and the contactor 2 having a plurality of contacting points 2a, 2b and 2c, resistance variation caused from abrasion or danger of electric discharge and the like are involved, and contact becomes unstable in the case of a mechanical deformation so that the reliability is decreased and life time is shortened, and also there is the problem that a lubricating material is required for contacting.

Further, since in the conventional mode switch device the mode switch is separated from the cam gear, a space for mounting the mode switch is required. Accordingly there is the problem of decreasing the setting space of the mode switch device.

SUMMARY OF THE INVENTION

Therefore, it is a primary object of the present invention to provide a non-contacting, rotary type mode switch system which overcomes the above-mentioned conventional defects and problems.

Another object of the present invention is to provide a non-contacting, rotary type mode switch system wherein a plurality of reflector pieces are formed on the tracks of concentric circles on the rear surface of a mode switch gear. A plurality of opto-reflection sensor units, having light emitting means and light receiving means are provided on the upper surface of a switch body. The reflector piece of the mode switch gear reflects the light emitted from the light emitting means in response to the rotational position of the cam gear, so that the light becomes incident to the receiving means, and the rotational position of the mode switch gear and cam gear are read out at the control means in response to detecting the presence or absence of the reflector piece at the light receiving means.

Still another object of the present invention is to provide a non-contacting, rotary type mode switch system wherein the cam gear and mode switch gear are rotatably fixed around the same axle pin so that they move cooperatively with each other, so that the required mounting space of the mode switch is decreased.

The present invention comprises a rotary type mode switch system wherein the mode switch gear is rotatably fixed around an axle pin firmly fixed at a mode switch body and the mode switch gear is cooperatively turned with a mode shifting gear, providing a non-contacting rotary type mode switch system which is constructed such that at least one reflector piece 15 arranged respectively on at least one track arranged concentrically on the rear surface of the mode switch gear with the predetermined type, and at least one opto-reflection sensor unit, having a light emitting means, such as light emitting diode, and receiving means, such as photo-transistor, are fixed at the mode switch body located below the mode switch gear.

According to the invention as described above, light emitted from a light emitting means of an opto-reflection sensor unit is reflected by the reflector piece of the mode switch gear cooperatively rotated with a cam gear, such that the reflected light is received by the opto-reflection sensor unit and then converted to an electric signal and thereafter transmitted to a running system driving control means, so that rotational position of the gear, i.e. the mode being executed, is detected.

BRIEF DESCRIPTION OF THE DRAWINGS

For a better understanding of the invention, and to show how the same may be effected, reference will now be made, by way of example, to the accompanying drawings, in which:

FIG. 4 is an exploded perspective view showing the structure of the essential parts of a preferred embodiment according to the present invention;

FIG. 5 is a cross-sectional view of the assembled state of FIG. 4;

FIGS. 6A and 6B are structural diagrams of the rear surface of the mode switch gear according to the present invention;

FIG. 7 is a schematic diagram for explaining the operation of the present invention;

DETAILED DESCRIPTION OF THE INVENTION

Hereinafter, a preferred embodiment of the present invention, as aforementioned, will be described in detail with reference to FIG. 4 to FIG. 7.

FIG. 4 is an exploded perspective view showing the structure of the essential parts according to a preferred embodiment of the present invention, and FIG. 5 is a cross-sectional view, partly cut out, showing the usual assembled state of the system of FIG. 4 whereby a mode switch gear 1 is rotatably fixed around an axle pin 3' firmly fixed to the mode switch body 3. Reflector pieces 8 (8a, 8b and 8c), for reflecting the light, are arranged respectively on concentric circles of the rear surface of a mode switch gear 1, and corresponding opto-reflection sensor units 9 (9a, 9b and 9c) are fixed respectively on concentric circles at a predetermined distance from the reflector pieces 8 (8a, 8b and 8c), on the upper surface of the mode switch body 3.

Figure 1:
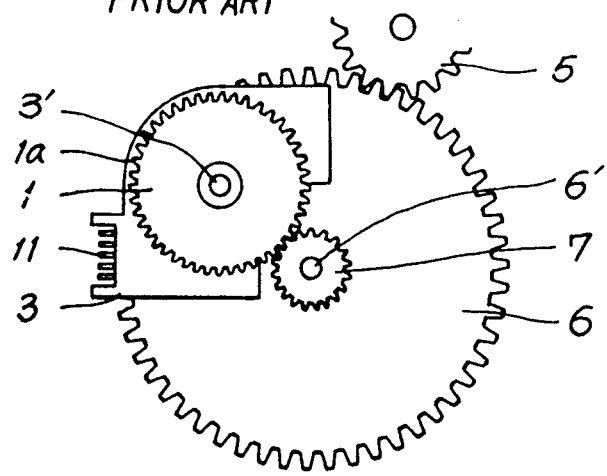
FIG. 1 is a plan view of a conventional contacting type mode switch system.
Figure 2:
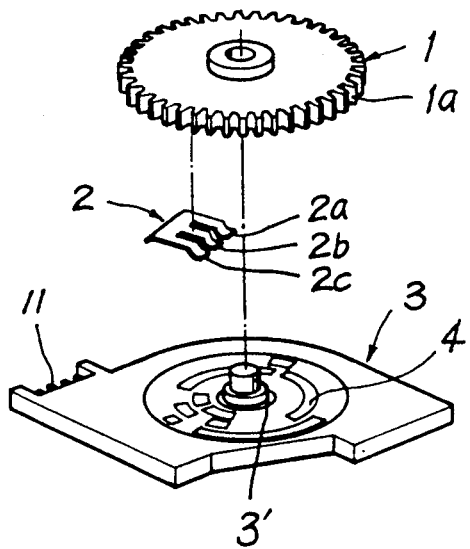
FIG. 2 is an exploded perspective view of the essential parts of FIG. 1.
Figure 3:
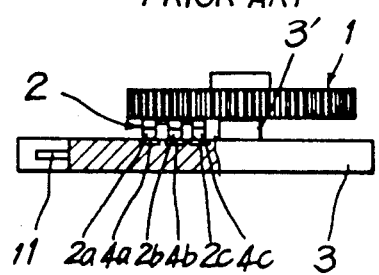
FIG. 3 is a cross-sectional view of the essential parts of FIG. 1.

The remaining structure is the same as the prior art. That is to say, the mode switch gear 1 is engaged with a pinion 7 fixed at on axle shaft 6' of the cam gear 6, as shown in FIG. 1, the cam gear 6 being mounted so as to rotate beneath the mode switch body 3, and the cam gear 6 being meshed with a driving force transmitting gear 5.

FIGS. 6A and 6B are diagrams for explaining the rear surface structure of the mode switch gear according to the present invention, in which FIG. 6A is a diagram for explaining the form and manner in which the reflector pieces are arranged on the rear surface of the mode switch gear, and FIG. 6B is a diagram for showing a state of the reflector pieces formed on the rear surface of mode switch gear. Referring to FIGS. 6A and 6B, the circle tracks a, b and c are arranged on the concentric circles so as to have a predetermined width on the rear surface of the mode switch gear 1, and at least one reflector piece 8a for track a, at least one reflector piece 8b for track b, at least one reflector piece 8c for track c are respectively formed while keeping a predetermined distance, so that they form one pattern corresponding to the various modes of a VCR as a whole, such as play, review, normal direction speed winding, reverse direction speed winding, stop, and the like. FIG. 6B is a diagram showing a state that one reflector piece 8 (8a, 8b and 8c) pattern is formed by carrying out as FIG. 6A.

FIG. 7 is a schematic diagram for showing a relation of reflector pieces 8 (8a, 8b and 8c) and opto-reflection sensor units 9 (9a, 9b and 9c) according to the present invention, in which opto-reflection sensor units 9a, 9b and 9c are arranged respectively on the concentric circles so as to correspond respectively under the reflector pieces 8a, 8b and 8c (refer to FIG. 5), and the opto-reflection sensor units 9a, 9b and 9c include a light emitting means 9' such as a light emitting diode, and a light receiving means 9'', such as a photo-transistor, respectively.

The light emitted from the light emitting means 9' of the opto-reflection sensor units 9a, 9b and 9c is reflected at the reflector pieces 8a, 8b and 8c, received at receiving means 9'' and converted to an electric signal, and thereafter applied to an electric circuit driving control means. The number of the opto-reflection sensor units 9 equals to the number of tracks of the reflector pieces 8.

Since the opto-reflection sensor units 9 detect the presence or absence of reflected light reflected from the reflector pieces 8, the number of detectable modes is determined by $2^n$, in response to the number (n) of opto-reflection sensor units 9.

Figure 8A:
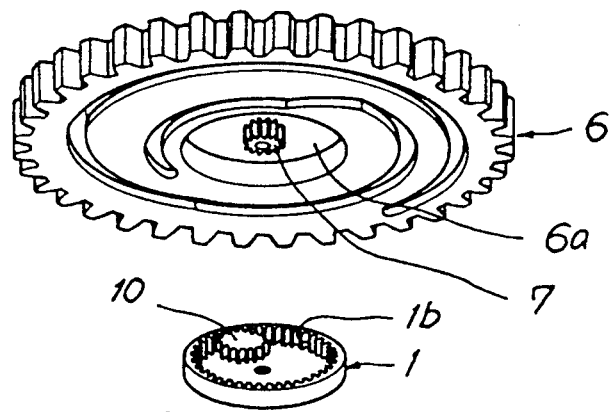
FIG. 8A and 8B exploded perspective views of a second embodiment of the present invention.
Figure 8B:
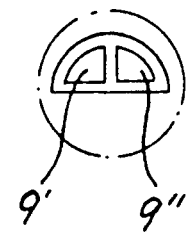
Figure 9:
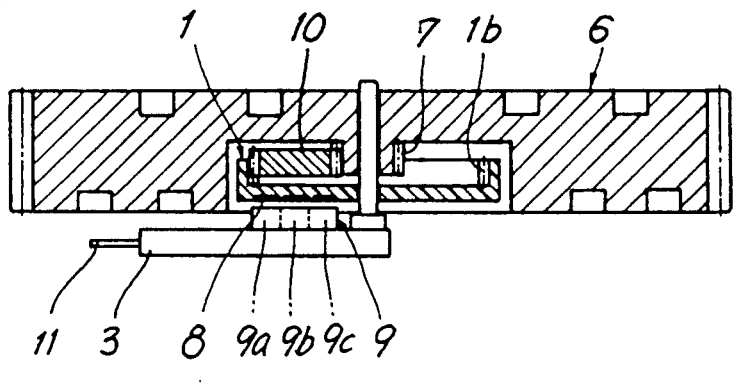
FIG. 9 is a cross-sectional view of an assembled state of the embodiment of FIG. 8.

FIGS. 8A and 8B, and FIG. 9 are, respectively, an exploded perspective view and a fragmentary cross sectional view of an assembled state for illustrating another embodiment of a non-contacting rotary type mode switch system according to the present invention, in which the cam gear 6 and mode switch gear 1 are rotatably fixed at upper and lower positions respectively around axle pin 3' firmly fixed at the mode switch body 3. A pinion 7 is rotatably fixed at a central portion of the cam gear 6, at the same time a circular groove 6a is formed therein. An internal gear 1b is formed at the internal peripheral circumference of the top surface of the mode switch gear 1, and a planetary gear 10 is meshed between the internal gear 1b and the pinion 7. The remaining structures are the same as the preferred embodiment of this invention.

According to this alternate embodiment of the present invention, since the cam gear 6 and mode switch gear 1 are rotatably fixed to the same axle pin 3' and the system is made as a reduced structure, it has a similar operation and effect as the above preferred embodiment, except it becomes more advantageous in improving the miniaturizing and assembling.

According to the non-contacting, rotary type mode switch system of the present invention as aforementioned, driving power is transmitted from the driving motor and the like mounted on the deck base board of the VCR to the driving power transmitting gear 5, and when it is rotated, the cam gear meshes therewith, and the mode switch gear 1 is rotated cooperatively with the cam gear 6. Thus, when the mode switch gear 1 is rotated, the reflector pieces 8a, 8b and 8c of a predetermined pattern formed on the rear surface are rotated, and the opto-reflection sensor units 9a, 9b and 9c, fixed at the mode switch body 3 of the lower position, detect the presence or absence of reflected light from the respective reflector pieces 8a, 8b and 8c. The opto-reflection sensor units produce the electric signal in response to the presence or absence of reflected light and transmit to the driving control means, and various structural modes, such as play, review, normal or reverse speed winding and stop mode, and the like, that are being executed in response to the transmitted signals, are discriminated.

Since the non-contacting rotary type mode switch system of the present invention, as described above, is formed with non-contacting type system utilizing the reflector pieces and opto-reflection sensor units instead of conventional contacting type mode switch, mechanical abrasion and electric discharging and the like, that conventional mode switch system include, can be prevented, and bad operation according to the mechanical deformation can be eliminated. And, though lubricating oil is required for making the contact of the switch to be smooth heretofore, since the system of the present invention does not require the lubricating oil, risk against the leakage or drying of lubricating oil can be eliminated.

Further, according to another embodiment of the present invention, the cam gear and mode switch gear are rotatably fixed around one single axle pin and the mode switch is disposed to the interior of the cam gear, so that an additional separate space for setting the mode switch is not required. Therefore, it is advantageous for miniaturizing the system, and the assembling capacity is good because the cam gear and mode switch can be assembled simultaneously.

It will be appreciated that the present invention is not restricted to the particular embodiment that has been described hereinbefore, and that variations and modifications may be made therein without departing from the spirit and scope of the invention as defined in the appended claims and equivalents thereof.

What is claimed is:

1. A non-contacting rotary type mode switch system for a magnetic tape recording device, said non-contacting rotary type mode switch system comprising:
    a mode switch body,
    a axle pin mounted on the center portion of said mode switch body,
    a cam gear having a pinion at the center portion of lower surface thereof and a circular groove at a circumference thereof, whereby the cam gear is rotatably fixed t the upper portion around the axle pin,
    a mode switch gear mounted on said mode switch body for moving cooperatively with said cam gear for mode shifting rotatably about said axle pin so as to be positioned at the upper part of the mode switch gear, said mode switch gear having an internal gear at the internal peripheral circumference of the top surface thereof,
    a planetary gear meshed between said pinion of said cam gear and said internal gear of said mode switch gear,
    a plurality of reflector pieces formed on tracks of a plurality of concentric circles, respectively, which are arranged on the rear surface of said mode switch gear, and
    a plurality of opto-reflection sensors mounted on the top surface of said switch body for reading out the rotational mode of said cam gear, said each opto-reflection sensor including:
    light emitting means for emitting the light, and
    light receiving means for detecting the light reflected from said corresponding reflector piece.

* * * * *